US009936673B2

(12) United States Patent
Langrell

(10) Patent No.: US 9,936,673 B2
(45) Date of Patent: Apr. 10, 2018

(54) LOCKING DEVICE FOR A LIVESTOCK HEAD GATE

(71) Applicant: Northquip Inc., Woodlands (CA)

(72) Inventor: Stephen Arthur Langrell, Woodlands (CA)

(73) Assignee: Northquip Inc., Woodlands (CA)

( * ) Notice: Subject to any disclaimer, the term of this patent is extended or adjusted under 35 U.S.C. 154(b) by 0 days.

(21) Appl. No.: 15/797,106

(22) Filed: Oct. 30, 2017

(65) Prior Publication Data

US 2018/0055005 A1 Mar. 1, 2018

Related U.S. Application Data

(63) Continuation of application No. PCT/CA2016/000241, filed on Sep. 23, 2016.

(51) Int. Cl.
*A01K 1/062* (2006.01)
*A01K 15/04* (2006.01)
*A01K 1/06* (2006.01)
*E05D 15/06* (2006.01)
*E05F 17/00* (2006.01)

(52) U.S. Cl.
CPC .......... *A01K 1/0606* (2013.01); *E05D 15/063* (2013.01); *E05F 17/004* (2013.01); *E05F 2017/005* (2013.01)

(58) Field of Classification Search
CPC ........ A01K 1/0613; A01K 1/062; A61D 3/00; A61D 2003/003
USPC ....... 119/524, 734, 731, 735, 737, 729, 752, 119/904, 733
See application file for complete search history.

(56) References Cited

U.S. PATENT DOCUMENTS 3,814,060 A * 6/1974 Swenson ................ A01K 1/062
119/734
4,357,906 A * 11/1982 Kratky ................ A01K 1/0613
119/731
4,517,924 A * 5/1985 McCan ................ A01K 1/0613
119/734
4,579,084 A * 4/1986 McCan ................ A01K 1/0613
119/731

(Continued)

FOREIGN PATENT DOCUMENTS

AU 2006201223 10/2006

*Primary Examiner* — Yvonne R Abbott-Lewis
(74) *Attorney, Agent, or Firm* — Kyle R Satterthwaite; Ryan W Dupuis; Ade & Company Inc.

(57) ABSTRACT

An improved locking device is provided for one a livestock head gate in which two doors rollingly engaged on an overhead guide shaft for roving movement of said two doors toward one another into a closed position bracing a livestock animal between said doors and away from one another into an open position releasing said livestock animal. Primary and secondary shaft-receiving and locking members have respective first and second through-holes therein for receipt of the overhead guide shaft. A spring-receipt member is fixed to the primary shaft-receiving member for cooperation with a spring that tilts the primary shaft-receiving member into a locking position. The secondary movable locking member is retained beside the primary member in a manner enabling both tilting therewith and displacement relative thereto so as to bite onto the shaft at the perimeter of the second through-hole in the locking position.

18 Claims, 6 Drawing Sheets

(56) References Cited

U.S. PATENT DOCUMENTS

| | | | | |
|---|---|---|---|---|
| 5,263,438 A * | 11/1993 | Cummings | ............... | A61D 3/00 119/732 |
| 5,375,560 A * | 12/1994 | Paul | ......................... | G01G 1/18 119/734 |
| 5,908,009 A * | 6/1999 | Cummings | ........... | A01K 1/0606 119/731 |
| 6,039,002 A * | 3/2000 | Strankman | .............. | A01K 1/105 119/57.1 |
| 6,536,375 B2 * | 3/2003 | Fergusson | ............. | A01K 1/0613 119/734 |
| 6,537,145 B1 * | 3/2003 | Derouin | ..................... | A22B 3/00 119/729 |
| 7,225,759 B2 * | 6/2007 | Kerns | ................... | A01K 1/0606 119/732 |
| 7,770,542 B2 * | 8/2010 | Mollhagen | ................ | A61D 3/00 119/734 |
| 8,869,749 B2 * | 10/2014 | Keong | ................. | A01K 1/0613 119/729 |
| 8,910,595 B2 * | 12/2014 | Ulrich | ................... | A01K 1/0613 119/732 |

* cited by examiner

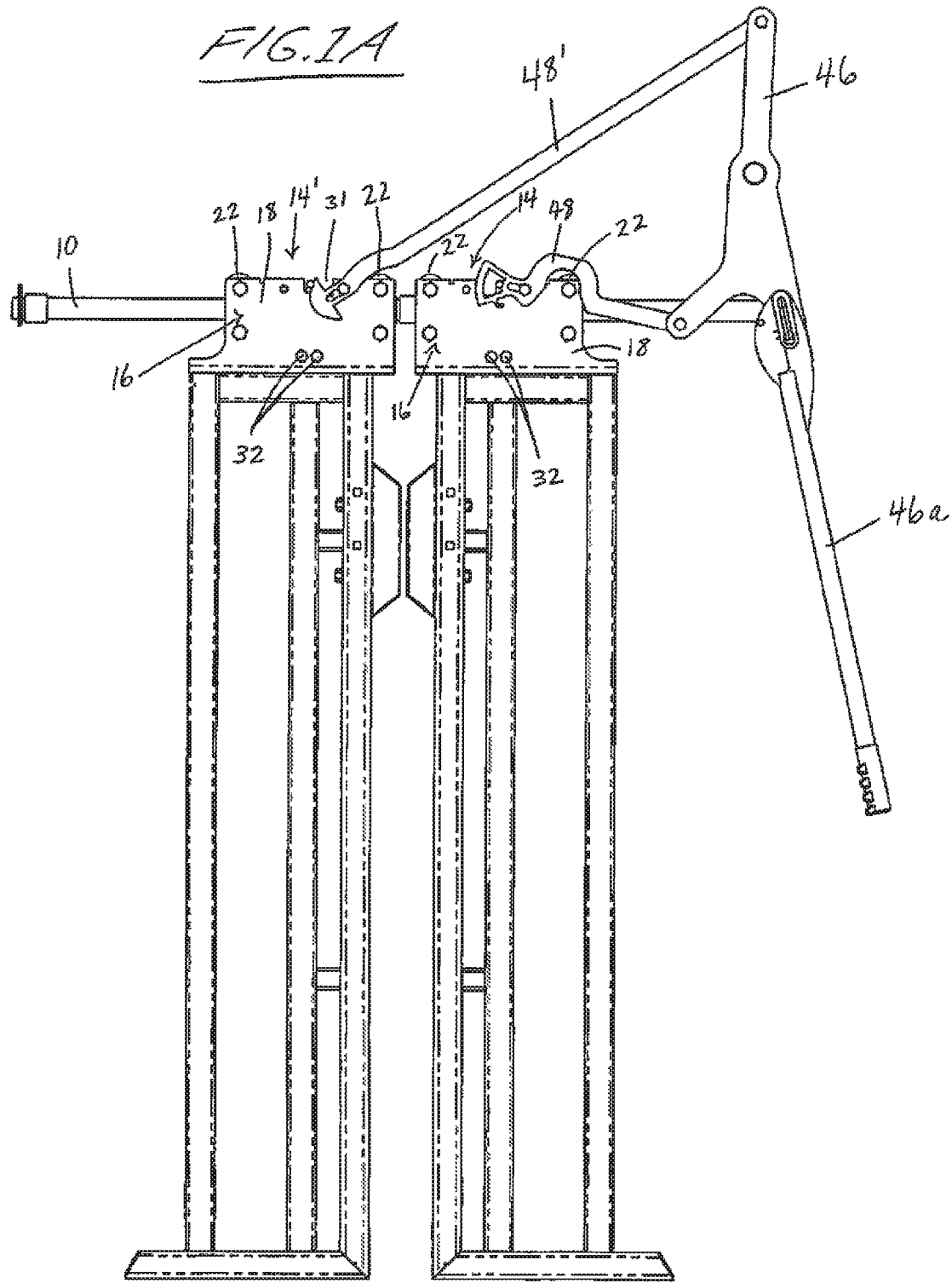

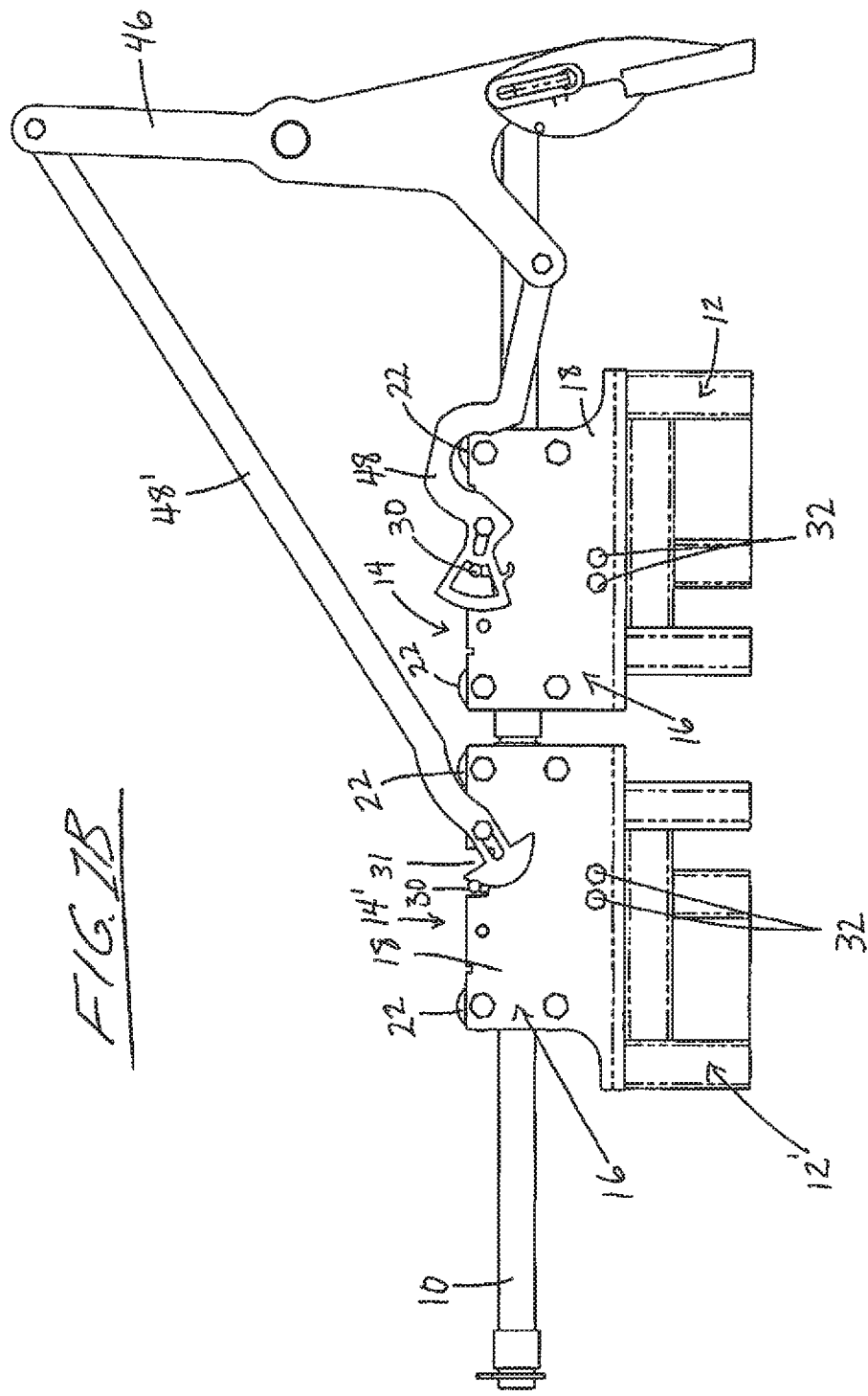

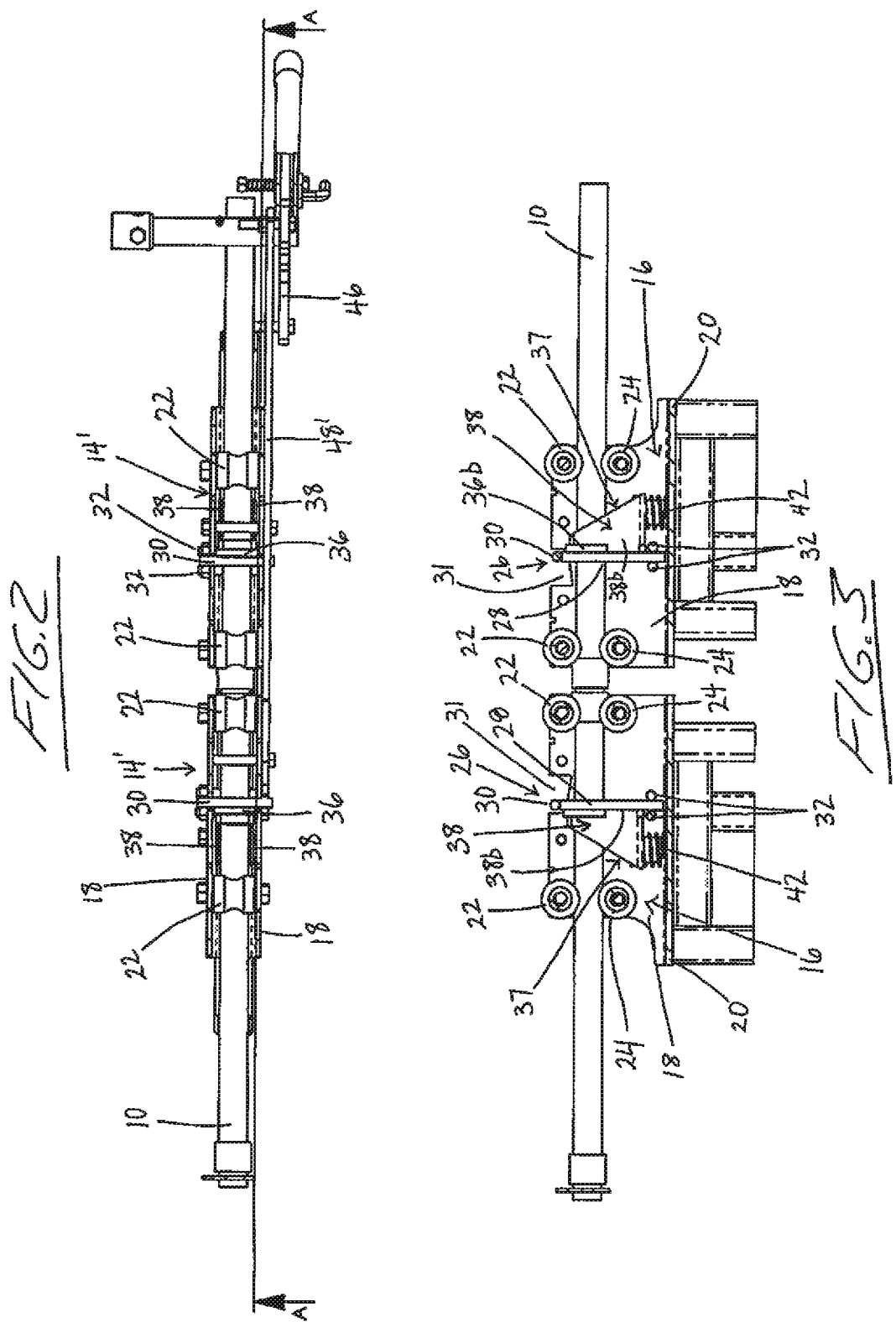

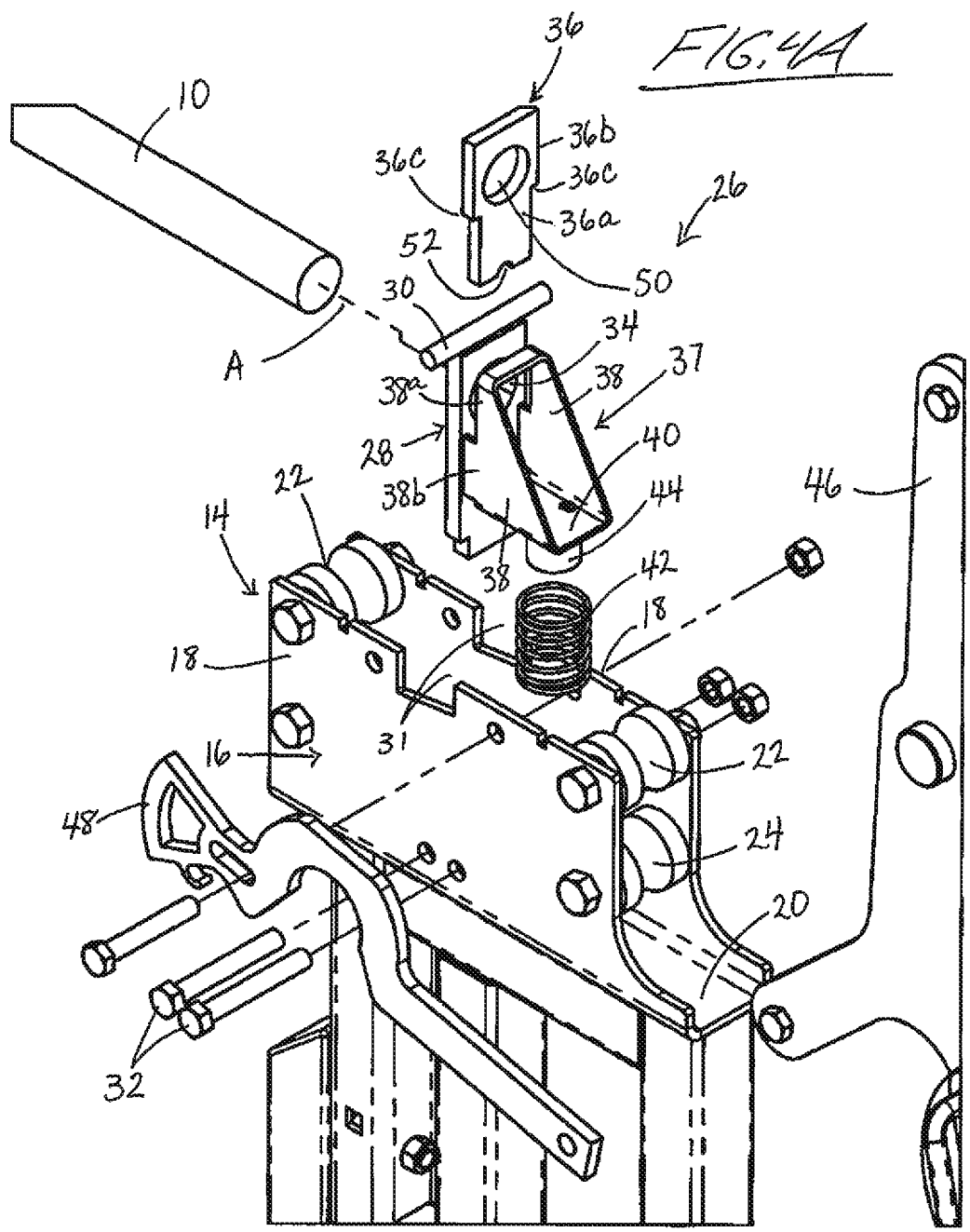

LOCKING DEVICE FOR A LIVESTOCK HEAD GATE

CROSS-REFERENCE TO RELATED APPLICATIONS

This application is a continuation of International PCT Application No. PCT/CA2016/000241, filed Sep. 23, 2016, the entirety of which is incorporated herein by reference.

FIELD OF THE INVENTION

The present invention relates generally to livestock head gates, and more particularly to an improved locking device for livestock head gates of the type in which a pair of doors are movable back and forth toward and away from one another by rolling support of said doors on an overhead guide shaft spanning across an animal-receiving opening of the head gate.

BACKGROUND

Australian Patent Application No. 2006201223 discloses a known type of livestock head gate that employs an overhead guide shaft on which two doors are movably carried by respective roller carriages at the top ends of the doors so that rolling movement of the two doors toward one another when an animals neck is present in the animal-receiving opening of the gate will force the doors against the opposing sides of the animal's neck to secure the animals head in a generally stationary position.

In existing head gates of this type, the doors are automatically locked in place by a respective spring-loaded locking device installed in the roller carriage at the upper end of each door. The roller carriage features a housing in the form of a U-shaped channel with two side walls standing upward from a flat horizontal bottom wall. The guide shaft passes longitudinally through this channel-shaped housing between the side walls thereof and above the bottom wall thereof. Near each end of the channel, a set of two rollers engage the topside and underside of the guide shaft for rolling movement of the carriage horizontally along the guide shaft.

The existing locking device features a single locking plate that resides between the side walls of the carriage housing and that features a through-hole by which the guide shaft passes horizontally through the locking plate. A spring plate projects outwardly from the locking plate on one side thereof at a location below the through-hole and the guide shaft passing therethrough. A dowel spanning across the top end of the locking plate is seated in a pair of notched cutouts in the top edges of the carriage's vertical side walls, and a lower end of the locking plate hangs between a pair of positioning pins that cross horizontally through the side walls of the carriage housing just above the bottom wall thereof.

A coiled compression spring is disposed between the bottom wall of the carriage housing and the underside of the spring plate, whereby this spring biases the locking plate out of a vertical orientation into a tilted orientation leaning away from the spring loaded side of the lock plate. This tilted position locks the roller carriage at its current position on the guide shaft by causing the perimeter edge of the locking plate's through-hole to frictionally bite against the periphery of the guide shaft. Being spring loaded into this tilted locking position, the locking plate will automatically lock the roller carriage at any given position, until a lock-release lever is used to push the top-end dowel of the locking plate toward the spring loaded side thereof, thereby forcing the locking plate to a vertically upright orientation withdrawing the perimeter edge of the locking plate's through-hole out of its frictionally biting engagement with the guide shaft.

Applicant has found that there is a desire to improve on the existing locking devices for livestock head gates of this type.

SUMMARY OF THE INVENTION

According to one aspect of the invention, there is provided an improved locking device for one of two doors of a livestock head gate of a type in which said two doors are equipped with respective roller carriages at upper ends thereof that are rollingly engaged on an overhead guide shaft traversing across an animal-receiving opening of the head gate for rolling movement of said two doors toward one another into a closed position bracing a livestock animal between said doors and away from one another into an open position releasing said livestock animal from between said doors, the improved locking device comprising:

a primary shaft-receiving member having a first through-hole that passes therethrough in a thickness direction thereof and is sized to accommodate sliding receipt of the overhead guide shaft therethrough in an unlocking position of the primary shaft-receiving member;

a spring-receipt member fixed to the primary shaft-receiving member and projecting outwardly away therefrom in the thickness direction for action of a locking spring of the respective roller carriage against said spring-receipt member in a manner tilting the primary shaft-receiving member into a locking position about an axis lying in a width direction of the primary shaft-receiving member; and a secondary movable locking member retained beside the primary shaft-receiving member in the thickness direction in a manner tiltable together with the primary shaft-receiving member and displaceable relative thereto in a height direction thereof, said secondary movable locking member having a second through-hole therein sized to accommodate sliding receipt of the overhead guide shaft therethrough in the unlocked position and to place a perimeter edge of the second through-hole into biting engagement with the periphery of the overhead guide shaft in the locking position.

Preferably the spring-receipt member is fixed to the primary shaft-receiving member at a location spaced below the first opening in the height direction for upward action of the locking spring of the respective roller carriage against an underside of said spring-receipt member.

Preferably the secondary movable locking member, relative to the primary shaft-receiving member, is free floating in the height direction thereof.

Preferably the location of the movable locking member is situated over the spring-receipt member of the primary shaft-receiving member.

Preferably the movable locking member is constrained against movement relative to the primary shaft-receiving member in the width direction.

Preferably the movable locking member is constrained against movement relative to the primary shaft-receiving member in the thickness direction.

Preferably the movable locking member is constrained by a pair of side walls attached to said primary shaft-receiving member in fixed relation thereto.

Preferably the pair of side walls are situated on a same side of the primary shaft-receiving member as the spring-receipt member.

Preferably the pair of side walls stand upright from the spring-receipt member.

Preferably the spring-receipt member is carried on the primary shaft-receiving member by said pair of side walls, which are affixed to the primary shaft-receiving member.

Preferably the side walls comprise lower portions between which the secondary movable locking member is constrained against movement in the width direction, and upper portions in which the secondary movable locking member is constrained against movement away from the primary shaft-receiving member in the thickness direction.

Preferably the side walls comprise cutouts in the upper portions thereof at which a widened upper portion of the secondary movable locking member reaches outwardly beyond respective planes of the side walls to overhang intact areas of the lower portions of the side walls that reside beneath said cutouts.

Preferably at least one gap is present between the primary shaft-receiving member and an inner end of the spring-receipt member nearest thereto, and a lower portion of the secondary movable locking member depends downwardly into said at least one gap.

Preferably the secondary movable locking member has a finger access notch in an underside thereof to aid in manual lifting of the secondary movable locking member into an operational position during installation of the locking device on the head gate.

Preferably a shape of the second through-hole is of greater dimension in the width direction than in the height direction.

Preferably the second through-hole is oval in shape.

Preferably the spring receipt member has a spring guide protruding from a bottom surface thereof for receipt of an upper end of the locking spring in coiled relation around said spring guide.

According to another aspect of the invention, there is provided an improved livestock head gate comprising:

two doors equipped with respective roller carriages at upper ends thereof;

an overhead guide shaft traversing across an animal-receiving opening of the head gate and on which the respective roller carriages are rollingly engaged for rolling movement of said two doors toward one another into a closed position bracing a livestock animal between said doors and away from one another into an open position releasing said livestock animal from between said doors;

each roller carriage comprising a respective locking device that comprises:

a primary shaft-receiving member having a first through-hole therein through which the overhead guide shaft passes;

a spring-receipt member fixed to the shaft-receiving member and projecting outwardly therefrom in a direction along said upright support shaft;

a locking spring acting against said spring-receipt member in a manner biasing the shaft-receiving member toward a tilted locking position; and a secondary movable locking member retained beside the shaft-receiving member in a manner tiltable together therewith and displaceable relative thereto in a direction upwardly and downwardly therealong, said secondary movable locking member having a second through-hole therein through which the overhead guide shaft also passes and which is dimensioned to place a perimeter edge of the second through-hole into biting engagement with the periphery of the overhead guide shaft in the tilted locking position.

BRIEF DESCRIPTION OF THE DRAWINGS

One embodiment of the invention will now be described in conjunction with the accompanying drawings in which:

FIG. 1A is an elevational view of a livestock head gate featuring a pair of improved door locking devices according to the present invention.

FIG. 1B is a partial close-up of the livestock head gate of FIG. 1A.

FIG. 2 is an overhead plan view of the livestock head gate of FIG. 1B.

FIG. 3 is a cross-sectional view of the livestock head gate of FIG. 2 as viewed along line A-A thereof.

FIG. 4A is a partially exploded perspective view of one door of the livestock head gate of FIG. 3.

In the drawings like characters of reference indicate corresponding parts in the different figures.

DETAILED DESCRIPTION

The appended drawings show several views of a head gate design employing improved door locking devices of the present invention. Extraneous components of the overall head gate that do not contribute to the inventive door locking aspects of the design have been omitted for illustrative simplicity, including an outer frame of the head gate that delimits the overall available animal-receiving opening of the head gate.

With initial reference to FIG. 1A, the guide shaft 10 is mounted in a horizontal orientation at an elevated location on the head gate to guide horizontal rolling movement of two doors 12, 12' back and forth along the guide shaft 10. Each door features a respective roller carriage 14, 14' at the top end thereof to provide the rolling support of the overall door on the guide shaft, and to carry a respective locking device operable to lock the respective door at any given position along the guide shaft. The doors of the illustrated embodiment are each made up of a framework of metal tubing, further description of which is omitted since the structure of the door itself is not pertinent to the inventive locking devices that are the subject of the present invention.

Figure 4B:
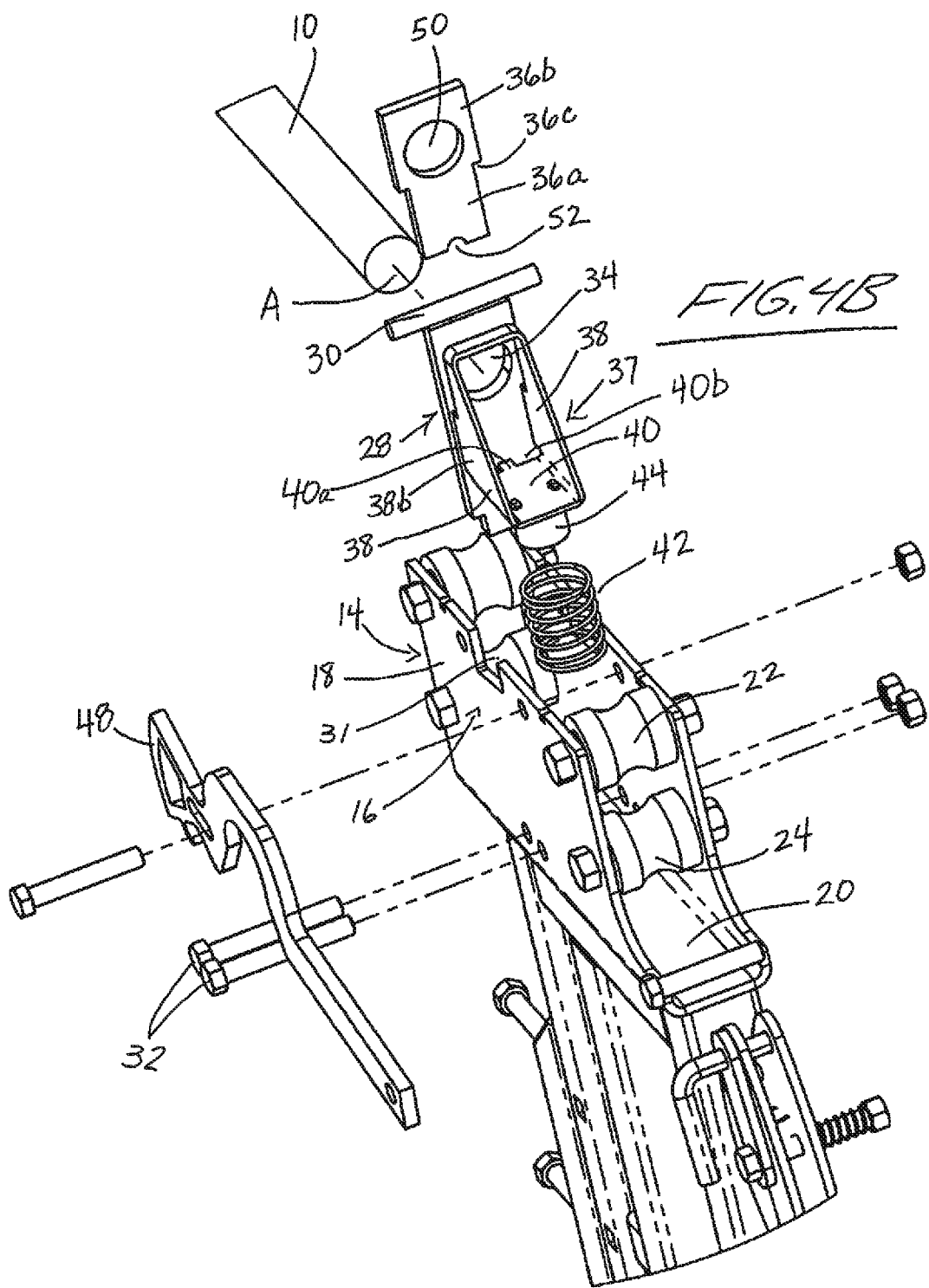
FIG. 4B is another partially exploded perspective view of the door of FIG. 4A from another angle.

As best shown in FIGS. 4A and 4B, which show one door's roller carriage 14, each roller carriage 14 features a housing 16 in the form of a U-shaped channel with two side walls 18 standing upward from a flat horizontal bottom wall 20. Near each end of the housing 16, a respective set of two rollers 22, 24 engage the topside and underside of the guide shaft 10 for rolling movement of the carriage 14 horizontally therealong. With reference to FIG. 3, the guide shaft 10 passes longitudinally through the channel-shaped housing of each roller carriage between the side walls thereof and above the bottom wall thereof, thus passing between the upper and lower rollers 22, 24 at each end of the carriage on a horizontal axis.

The two roller carriages 14 and the locking devices 26 installed therein are of identical or substantially identical construction, and are installed in mirrored configuration to one another across the center of the guide shaft. Accordingly, the detailed description given herein is written primarily with reference to only one carriage and its corresponding locking device, with the understanding that the same description applies to the other carriage as well.

The locking device 26 of each roller carriage is installed at an intermediate location along the channel-shaped housing thereof so as to reside between the two respective pairs of rollers. The locking device 26 features a primary shaft-receiving plate 28 that resides between the side walls 18 of the carriage housing. The primary shaft-receiving plate has a height dimension that exceeds a width dimension measured orthogonal thereto, which in turn exceeds a thickness dimension measured orthogonal to the height and width dimensions. In an unlocking position described in more detail further below, the primary shaft-receiving plate occupies a vertical orientation in which its height stands vertically upright, its thickness extends parallel to the horizontal longitudinal axis A of the guide shaft, and its width extends perpendicularly transverse to the horizontal longitudinal axis A of the guide shaft. Reference is made herein to thickness, width and height directions corresponding to these dimensions of the primary shaft-receiving plate to serve as a reference in relation to the positioning and orientation of other components of the locking device. In the locking position described in more detail further below, the primary shaft-receiving plate is tilted out of its vertical unlocking position by a small oblique angle, whereby the primary shaft-receiving plate's thickness and height dimensions are no longer purely parallel and perpendicular to the longitudinal axis of the guide shaft, but the thickness and height directions are nonetheless still useful as reference directions lying generally along and transversely upright across the shafts longitudinal axis.

The primary shaft-receiving plate 28 features a horizontal dowel 30 that is fixed to and runs along the top edge of the primary shaft-receiving plate 28. The length of the dowel 30 exceeds the width of the primary shaft-receiving plate 28 so that the ends of the dowel 30 reach outwardly from the plate into respective notches 31 cut into the top edges of the carriage side walls 18. A pair bolts 34 cross horizontally through the side walls 18 of the carriage housing 16 just above the bottom wall 20 thereof, and the lower end of the primary shaft-receiving plate 28 depends downwardly between these two bolts 32 toward the bottom carriage wall 20. The shafts of these bolts 32 thus define positioning pins for locating the lower end of the primary shaft-receiving plate 28. The notches 31 in the top edges of the carriage side walls have a width exceeding the diameter size of the dowel 30, and the resulting greater size of the notches relative to the cross-sectional size of the dowel allows the primary shaft-receiving plate to tilt back and forth about a transverse axis lying in the width direction of the primary shaft-receiving plate at the lower portion thereof disposed between the positioning pin bolts 34. The primary shaft-receiving plate 28 features a first through-hole 34 passing through its thickness dimension, and the guide shaft 10 passes horizontally through the primary shaft-receiving plate 28 via this first through-hole 34. The diameter of the first through-hole 34 slightly exceeds that of the guide shaft 10 so that in the vertically upright unlocking position of the primary shaft-receiving plate, the guide shaft is slidable back and forth through the first through-hole relative to the primary shaft-receiving plate, thereby enabling uninhibited rolling movement of the carriage on the guide shaft in this unlocked state.

The unique locking device 26 features a secondary movable locking plate 36 that is separate and distinct from the primary shaft-receiving plate 28, and also includes a unique positioning bracket 37 affixed to one side of the primary shaft-receiving plate 28 to carry the secondary movable locking plate 36 thereon. The positioning bracket 37 features two planar side walls 38 projecting outward from a face of the primary shaft-receiving plate 28 on opposite sides of the first through-hole 34. These bracket side walls 38 reside in vertical planes that are parallel to the axial direction of the first through-hole 34 (i.e. parallel to the thickness dimension of the primary shaft-receiving plate) and parallel to the axial direction of the guide shaft 10. A bottom wall 40 of the positioning bracket 37 spans perpendicularly between the two bracket side walls 38 at the bottom ends thereof, which reside at a spaced distance below the first through-hole 34. The plane of the bottom bracket wall 40 is parallel to the axial direction of the first-through hole 34, whereby the bottom wall 40 projects outwardly away from the face of the primary shaft-receiving plate 28 in the thickness direction thereof so as to reach generally along the guide shaft 10.

This bottom bracket wall 40 effectively defines a spring-plate of the locking device 26, as an upper end of a coiled compression spring 42 abuts against the underside of the bottom bracket wall 40, while the lower end of the spring 42 is seated against the topside of the carriage's bottom wall 20, as best shown in FIG. 3. The bottom bracket wall 40 thus serves as a spring-receipt member fixed to the primary shaft-receiving plate to receive the spring action and convert same into a tilting action on the primary shaft-receiving plate. To maintain proper alignment of the spring 42 with the bottom bracket wall 40, a cylindrical spring guide 44 projects perpendicularly from the underside of the bottom bracket wall 40 to receive the upper end of the spring 42 in a coiled position around the spring guide. The diameter of the spring guide 44 closely matches the internal diameter of the coiled spring 42 to provide a snug fit therebetween to positively maintain the position of the spring's upper end relative to the bottom bracket wall 40.

The spring 42 provides an upward force on the bottom bracket wall 40 to bias the primary shaft-receiving plate 28 out of its vertically upright unlocking position into its tilted locking position leaning away from the spring-loaded side of the locking plate 28. This tilted position locks the roller carriage 14 at its current position on the guide shaft 10 by causing the top and bottom of the perimeter edge of the primary shaft-receiving plate's through-hole 34 to bite against the periphery of the guide shaft 10 at the top and bottom thereof. Being spring loaded into this tilted locking position, the primary shaft-receiving plate 28 will automatically lock the roller carriage at any given position along the guide shaft 10 in the absence of an unlocking action overcoming the spring bias to stand the locking plate 28 vertically upright into its unlocking position that allows free relative sliding between the guide shaft and the primary shaft-receiving member at the first through-hole therein.

With reference to FIG. 3, each locking device 26 is oriented so that the spring-loaded, bracket-equipped side of the primary shaft-receiving plate 28 faces outwardly along the axial direction of the guide shaft 10. That is, the spring loaded side of the locking device of each door 12 faces away from the other door. The upward spring force applied to the bracket on the outer side of the primary shaft-receiving plate thus causes the dowel-equipped upper end of the primary shaft-receiving plate to tilt toward the center of the guide shaft, i.e. tilt toward the opposite door. This way, forces applied to the hanging doors in the outward gate-opening direction (i.e. toward the ends of the guide shaft) by the animal constrained between the doors will further contribute to tilting of the primary shaft-receiving plates toward the center of the guide shaft (i.e. toward one another), thus increasing the effective bite strength of the primary shaft-receiving plates on the shaft in order to better resist this attempted opening of the doors by the constrained animal. Only under operation of a lock-release lever 46 in an appropriate direction via attached handle 46*a* will the locked state of the doors be released by way of linkage arms 48, 48' that are respectively coupled between the lever 46 and the upper dowels 30 of the primary shaft-receiving plates 28. When the lever handle is manually actuated in the appropriate unlocking direction, the linkage arms 48, 48' pivot the primary shaft-receiving plates in the reverse direction about the transverse axes at their pin-constrained lower ends toward the unlocked vertical orientation that releases the biting action of the primary shaft-receiving plates on the guide shaft.

Referring again to FIG. 4A, each bracket side wall 38 has an inner end affixed to the primary shaft-receiving plate 28. At this inner end, each bracket side wall 38 features a cut-out space 38*a* and an intact tab-like lower area 38*b* situated beneath the cut-out space 38*a*. The intact tab-like lower area 38*b* stands upright from the bottom bracket wall 40 to provide the attachment of the bracket 37 to the primary shaft-receiving plate 28. The cut-out upper space 38*a* creates a space between the bracket side walls 38 and the face of the primary shaft-receiving plate 28 at this upper portion of the bracket. The bottom bracket wall 40 is carried on the primary shaft-receiving plate 28 by the bracket side walls 38. The bottom bracket wall 40 reaches inwardly toward the face of the primary shaft-receiving plate 28 from the distal outer ends of the bracket side walls 40. With reference to FIG. 4B, an intact center tab 40*a* of the bottom bracket wall 40 reaches the primary shaft-receiving plate 28. On either side of this center tab 40*a*, a respective gap 40*b* is left between the inner end of the bottom bracket wall 40 and the face of the primary shaft-receiving plate 28.

The secondary movable locking plate 36 features a lower portion 36*a* whose width is slightly less than the distance between the two bracket side walls 38, and a widened upper portion 36*b* whose width exceeds that distance. The height of the narrower lower portion 36*a* of the secondary movable locking plate 36 exceeds the height by which tab-like lower area 38*b* at the inner end of each bracket side wall 38 stands upwardly from the bottom bracket wall 40. To support the secondary movable locking plate 36 in an installation-ready position beside the primary shaft-receiving plate 28 at the bracketed side thereof, prior to sliding of the roller carriage onto the guide shaft from an end thereof during assembly of the head gate, the lower portion 36*a* of the secondary movable locking plate 36 is lowered into place between the intact lower areas 38*b* of the bracket side walls 38 until the overhanging shoulder 36*c* created at the junction of the upper and lower portions of the secondary movable locking plate are seated atop the intact tab-like lower areas 38*b* of the bracket side walls 38. In this installation-ready position, the widened upper portion 36*b* of the secondary movable locking plate reaches outwardly through the cut-out areas 38*a* of the upper portions of the bracket side walls, thus overhanging the intact lower areas 38*b* thereof, and the lower end of the secondary movable locking plate 36 reaches downwardly into and through the gaps 40*b* between the bottom bracket wall 40 and the primary shaft-receiving plate.

In this installation-ready position of the secondary movable locking plate, where it is seated on the bracket side walls, a second through-hole 50 defined in the widened upper portion 36*b* of the secondary movable locking plate overlaps with the first through-hole 34 in the primary shaft-receiving plate 28, but does not completely align therewith, instead residing at a slightly lower elevation. From this installation-ready position, the secondary movable locking plate must be lifted out of its seated condition on the positioning bracket to align the two through-holes with one another and enable relative passage the guide shaft through these aligned holes in order to achieve the installed state of the locking device and roller carriage on the guide shaft. To enable this installation, a rounded finger access notch 52 is provided in the bottom edge of the secondary movable locking plate 36 to span over the intact center tab 40*a* of the bottom bracket wall 40. The finger access notch 52 arches over the center tab 40 of the bottom bracket wall 40 in the seated installation-ready position of the secondary movable locking plate. This way, a user's fingertip can reach into this notch 52 at the bottom of the secondary movable locking plate from inside the positioning bracket in order to lift the secondary movable locking plate out of its seated position into its operational position aligning the two through-holes with one another to enable sliding of the locking device onto the guide shaft 40.

In this installed state of the roller carriage and its respective locking device, the majority of the widened upper portion of the secondary movable locking plate continues to occupy the cut-out spaces 38*a* in the bracket side walls in overhanging relation to the underlying intact tab-like areas 38*b*, and the majority of the narrower portion of the secondary movable locking plate likewise continues to reside between the intact tab-like areas 38*b*, but the secondary movable locking plate is no longer seated on and supported by the bracket 37. Instead, the secondary movable locking plate is carried by the guide shaft 10 in an operational position beside the primary shaft-receiving plate in floating relation thereto, by which the secondary movable locking plate is displaceable upwardly and downwardly along the face of the first locking plate in the height direction thereof.

The cut-out upper areas 38*a* in the bracket side walls that accommodate the overhanging outer areas of the widened upper portion 36*b* of the secondary movable locking plate only slightly exceed the thickness of the secondary movable locking plate, whereby the remainder of the upper portion of each bracket side wall 38 blocks the secondary movable locking plate 36 from moving away from the primary shaft-receiving plate 28 in the thickness direction thereof. The width of the narrower lower portion 36*a* of the secondary movable locking plate 36 is only slightly smaller than the distance measured between the bracket side walls 38 in the width direction of the primary shaft-receiving plate 28, whereby the side walls also block side to side movement of the secondary movable locking plate. Accordingly, while not directly supported by the bracket 37, the secondary movable locking plate 36 is constrained by the positioning bracket 37 in both the thickness and width directions of the primary shaft-receiving plate. However, without any physical attachment to the positioning bracket 37, the secondary movable locking plate is free floating relative to the positioning bracket and the primary shaft-receiving plate in the height direction thereof, whereby the primary and secondary plates are slidably displaceable relative to one another in the height direction at the facing-together planar sides of these two plates.

Figure 5A:
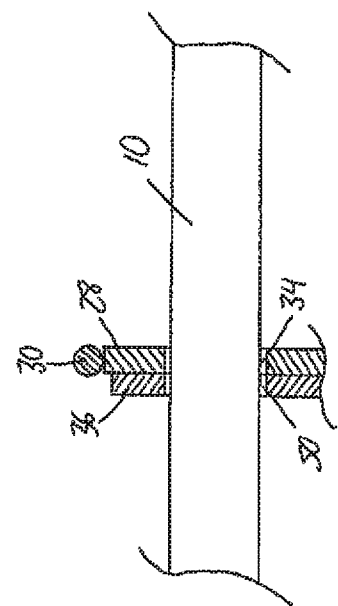
FIG. 5A is a schematic cross-sectional view of primary and secondary plates of one of the locking devices in a locking position on an overhead guide shaft of the livestock head gate.
Figure 5B:
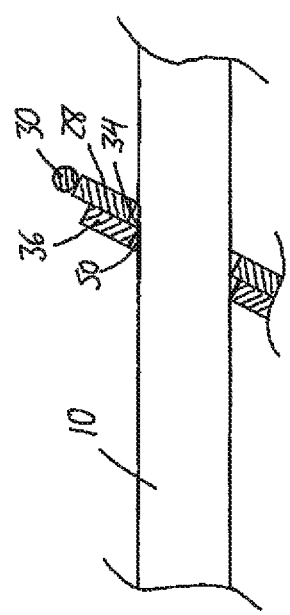
FIG. 5B is a schematic cross-sectional view of the primary and secondary plates of FIG. 5A in an unlocking position on the overhead guide shaft.

Since the secondary movable locking plate is constrained in the thickness and width directions by the bracket side walls so that is can't be displaced across or away from the primary shaft-receiving plate, the second locking plate will thus tilt together with the primary shaft-receiving plate during movement thereof between the locking and unlocking positions. The floating condition of the secondary movable locking plate in the height direction allows the secondary movable locking plate to shift relative to the primary shaft-receiving plate as these plates are tilted between the locking and unlocking positions. This way, the two through-holes align with one another to fit around the guide shaft in a loose slide-enabling manner in the unlocking position, but the secondary movable locking plate can shift downward relative to the primary shaft-receiving plate as the plates are tilted into the locking position so that both the primary and secondary plates bite into the shaft. FIGS. 5A and 5B schematically illustrate the locking and unlocking positions respectively, whereby it can be seen that the two through-holes concentrically align with one another in the unlocking position, but the second through-hole 50 must reside slightly lower than the first through-hole 34 in the locking position.

Applicant has found that an improved locking functionality is obtained by this inclusion of a secondary movable locking plate 36 that is movable relative to the primary shaft-receiving plate 28 in the height direction while constrained in other directions so as to tilt together with the primary shaft-receiving plate 28 and bite onto the guide shaft at the top and bottom perimeter edges of the second through-hole under the tilting action provided by the locking spring 42. Not only is a greater locking action achieved, but applicant has found that the overall locking device also releases more easily from the guide shaft under due to the use of a secondary movable locking plate 36. Additionally, Applicant has found that reliable locking can still be achieved with the use of the floating secondary plate when the guide shaft is lubricated, whereas the existing head gates of this type were not suitable for lubrication. By reducing wear, such lubrication can improve the product life of the head gate and reduce need for repair, or frequency of such repair. Furthermore, the floating condition of the secondary movable locking plate relative to the remainder of the locking device enables simple removal of the secondary movable locking plate when the roller carriage is removed from the guide shaft, thus allowing replacement of just the removable secondary movable locking plate alone rather than the entire locking device. This improves the serviceability of the locking device and reduces associated repair costs for the overall head gate.

In the illustrated embodiment, the second through-hole 50 in the secondary movable locking plate 36 has an oblong shape of greater dimension in the width direction than in the height direction thereof so that the smaller height dimension provides effective biting action on the guide shaft under a prescribed degree of tilt of the primary and secondary plates, while extra clearance is provided on the sides of the guide shaft by the larger width dimension to prevent binding of the roller carriages on the guide shaft in the event of minor twists or deviations in the guide shaft. In the illustrated embodiment, the first and second through-holes are both of equal dimension in the height direction, so that the primary and secondary plates simultaneously and equally bite onto the shaft upon reaching a predetermined tilt angle relative thereto under the action of the locking spring. The first through-hole may have matching size and shape to that of the second through-hole, or may vary in either of size or shape in relation thereto.

While the illustrated embodiment employs primary and secondary plates of purely planar form to perform the locking action on the guide shaft, it will be appreciated that the overall shape of these elements may vary from a purely flat plate-like form, and so these components are also referred to herein more generally as primary and secondary members. Likewise, although the illustrated embodiment has the spring 42 abutted against a flat plate-like bottom wall 40 of the positioning bracket, the particular shape or configuration of this spring-receiving component may vary from a purely planar plate-like form, and therefore is also referred to herein as a spring-receipt member. Also, while the illustrated embodiment employs a singular bracket whose walls cooperate to both receive the spring action and constrain the floating locking plate in its useful operating position beside the primary shaft-receiving plate, these functions may alternatively be provided by separate structures, each of which may vary in particular shape or form from those of the illustrated embodiment.

Finally, while the foregoing description and accompanying figures show both of the primary and secondary plates as biting into the shaft in the titled locking orientation of the primary plate, the first through-hole may alternatively exceed the second through-hole in height such that only the secondary movable locking plate 36 bites onto the shaft in the tilted locking position. This way, only the secondary movable locking plate 36 undergoes any wear under the repeated locking and unlocking actions, thus improving the useful life of the primary shaft-receiving plate.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An improved livestock head gate comprising:
 two doors equipped with respective roller carriages at upper ends thereof;
 an overhead guide shaft traversing across an animal-receiving opening of the head gate and on which the respective roller carriages are rollingly engaged for rolling movement of said two doors toward one another into a closed position bracing a livestock animal between said doors and away from one another into an open position releasing said livestock animal from between said doors;
 each roller carriage comprising a respective locking device that comprises:
  a primary shaft-receiving member having a first through-hole therein through which the overhead guide shaft passes;
  a spring-receipt member fixed to the primary shaft-receiving member and projecting outwardly therefrom in a direction along said upright support shaft;
  a locking spring acting against said spring-receipt member in a manner biasing the primary shaft-receiving member toward a tilted locking position; and
 a secondary movable locking member retained beside the primary shaft-receiving member in a manner tiltable together therewith and displaceable relative thereto in a direction upwardly and downwardly therealong, said secondary movable locking member having a second through-hole therein through which the overhead guide shaft also passes and which is dimensioned to place a perimeter edge of the second through-hole into biting engagement with the periphery of the overhead guide shaft in the tilted locking position.

2. The livestock head gate of claim 1 wherein the spring-receipt member of at least one of the locking devices is fixed to the primary shaft-receiving member at a location spaced below the first through hole and the locking spring acts upwardly against an underside of said spring-receipt member.

3. The livestock head gate of claim 1 wherein the secondary movable locking member of at least one of the locking devices is free floating relative to the primary shaft-receiving member thereof in the direction upwardly and downwardly therealong.

4. The livestock head gate of claim 1 wherein the location of the secondary movable locking member of at least one of the locking devices is situated over the spring-receipt member of the primary shaft-receiving member.

5. The livestock head gate of claim 1 wherein the secondary movable locking member of at least one of the locking devices is constrained against movement relative to the primary shaft-receiving member in a width direction thereof that is laterally transverse to the guide shaft.

6. The livestock head gate of claim 1 wherein the secondary movable locking member of at least one of the locking devices is constrained against movement relative to the primary shaft-receiving member in a thickness direction thereof that runs generally along the guide shaft.

7. The livestock head gate of claim 1 wherein the secondary movable locking member of said at least one of the locking devices is constrained against movement relative to the primary shaft-receiving member in a width direction thereof that is laterally transverse to the guide shaft by a pair of side walls attached to said primary shaft-receiving member in fixed relation thereto.

8. The livestock head gate of claim 7 wherein the pair of side walls are situated on a same side of the primary shaft-receiving member as the spring-receipt member.

9. The livestock head gate of claim 8 wherein the pair of side walls stand upright from the spring-receipt member.

10. The livestock head gate of claim 9 wherein the spring-receipt member of said at least one of the locking devices is carried on the primary shaft-receiving member by said pair of side walls, which are affixed to the primary shaft-receiving member.

11. The livestock head gate of claim 7 wherein the side walls comprise lower portions between which the secondary movable locking member is constrained in a lateral direction transverse to the guide shaft, and upper portions in which the secondary movable locking member in constrained in a longitudinal direction along the guide shaft to block movement of the secondary movable locking member away from the primary shaft-receiving member.

12. The livestock head gate of claim 11 wherein the side walls of at least one of the locking devices comprise cutouts in the upper portions thereof at which a widened upper portion of the secondary movable locking member reaches outwardly beyond respective planes of the side walls to overhang intact areas of the lower portions of the side walls that reside beneath said cutouts.

13. The livestock head gate of claim 1 wherein the secondary movable locking member of said at least one of the locking devices is constrained against movement relative to the primary shaft-receiving member in a thickness direction thereof that runs generally along the guide shaft by a pair of side walls attached to said primary shaft-receiving member in fixed relation thereto.

14. The livestock head gate of claim 1 wherein, on at least one of the locking devices, at least one gap is present between said primary shaft-receiving member and an inner end of the spring-receipt member nearest thereto, and a lower portion of the secondary movable locking member depends downwardly into said gap.

15. The livestock head gate of claim 1 wherein the secondary movable locking member of at least one of the locking devices has a finger access notch in an underside thereof to aid in manual lifting of the of the secondary movable locking member into an operational position during installation of the locking device on the head gate.

16. The livestock head gate of claim 1 wherein a shape of the second through-hole of at least one of the locking devices is of greater dimension measured across the secondary movable locking member than upwardly and downwardly of said secondary locking member.

17. The livestock head gate of claim 1 wherein the second through-hole of at least one of the locking devices is oval in shape.

18. The livestock head gate of claim 1 wherein the spring receipt member of at least one of the locking devices has a spring guide that protrudes from a bottom surface thereof and around which an upper end of the locking spring is coiled.

* * * * *